Dec. 22, 1931.  F. W. MANSFIELD  1,837,623

REEL SEAT CLAMP FOR FISHING RODS

Filed Nov. 1, 1930

Inventor.
Frank W. Mansfield
by Heard Smith & Tennant.
Attys.

Patented Dec. 22, 1931

1,837,623

UNITED STATES PATENT OFFICE

FRANK W. MANSFIELD, OF CANTON, MASSACHUSETTS, ASSIGNOR TO G. H. MANSFIELD & CO. INC., OF CANTON, MASSACHUSETTS, A CORPORATION OF MASSACHUSETTS

REEL SEAT CLAMP FOR FISHING RODS

Application filed November 1, 1930. Serial No. 492,649.

This invention relates to reel seat clamps for fishing rods and it has for its object to provide a novel reel seat clamp by which a reel can be firmly clamped to the fishing rod and can also be readily adjustable longitudinally of the rod and thereby clamped in different positions.

The particular features wherein the invention resides will be more fully hereinafter set forth and then pointed out in the appended claim.

In the drawings wherein I have illustrated a selected embodiment of my invention, Fig. 1 is a fragmentary view of the butt end of a fishing pole showing my improved reel seat clamp;

Figure 1:
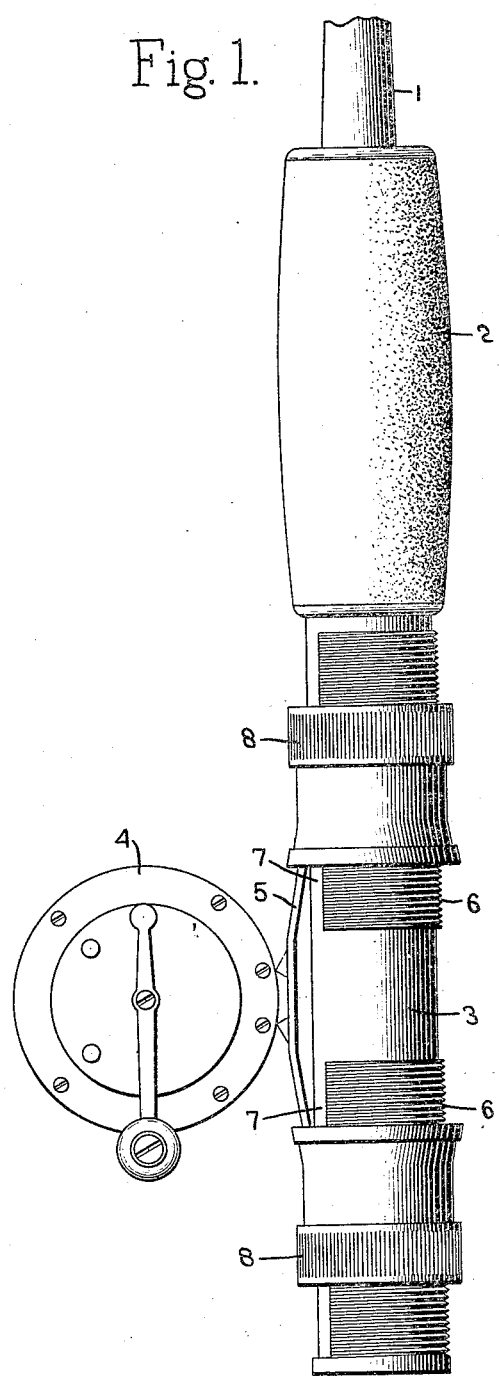
Figure 2:
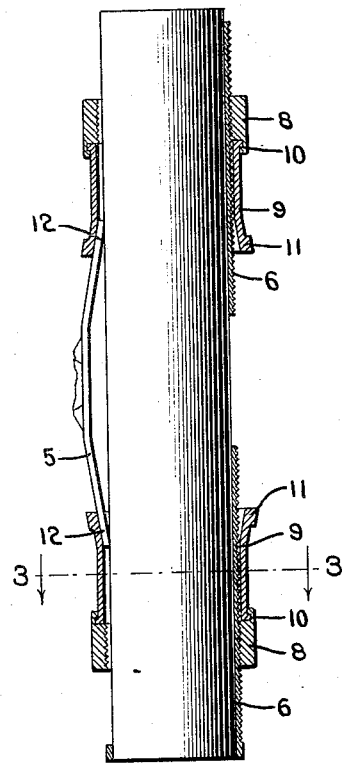
Fig. 2 is a sectional view showing the clamping sleeves in section.
Figure 3:
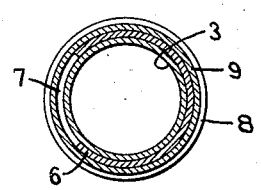
Fig. 3 is a section on the line 3—3, Fig. 2.

In the drawings 1 indicates a fish pole having the usual handle 2 and provided in the rear of the handle with a butt portion or member 3 to which the fishing reel 4 is clamped. This fishing reel is carried by a seat member 5 as usual and the present invention relates to the construction by which the seat member 5 is clamped to the butt member 3. This butt member is provided with two exteriorly screw-threaded portions 6 which are spaced from each other. These screw threads in each portion 6 extend only part way around the butt member 3 thereby leaving on one side of said member at said screw-threaded portion a space 7 which is free from screw threads and to which said member 5 is clamped.

Screw threaded on each screw-threaded portion is a collar 8 and each collar carries a clamping sleeve 9 which is connected thereto by a connection 10 that allows the collar to turn freely relative to the sleeve. Each clamping sleeve 9 is situated exteriorly of the screw threads 6 and the interior thereof is flared outwardly slightly at its end as indicated at 11. The flared ends or mouth portions 11 of the sleeves 9 are adapted to receive the ends 12 of the reel seat 5.

In operation of the device one or both of the collars 8 will be screwed backwardly thereby to separate the clamping sleeves 9 sufficiently to allow the reel seat to be inserted. This is done by inserting one end 12 thereof into the flaring mouth 11 of one clamping sleeve 9 and then screwing the other collar forwardly so as to bring its clamping sleeve into embracing and clamping engagement with the other end of the reel seat 5.

By this operation the reel seat is firmly clamped in position. As stated above this operation of clamping the reel seat in position can be performed by manipulating either one or both of the clamping sleeves.

Since each clamping sleeve 9 is connected to a collar 8 it is possible to adjust both clamping sleeves longitudinally of the butt member 3 thereby providing for shifting the position of the reel bodily in the direction of the length of said member 3. This is advantageous because for one reason or another a fisherman often desires to shift his reel so as to bring it closer to or further from the handle 2. My invention permits this to be done.

There is also an advantage in having the clamping sleeve separate from but rotatively connected to the screw-threaded collar. With this construction the turning of the collar to advance or retract the sleeve does not cause any turning movement of the sleeve but simply moves the sleeve axially into clamping engagement with the reel seat. By this means the clamping of the reel seat does not tend to disturb it or throw it out of a position parallel to the butt as would be the case if the clamping member which engaged the reel seat had a rotative movement.

I claim.

In a reel seat clamp for fish poles, the combination with the cylindrical butt member of a fish pole, the latter having two exteriorly screw-threaded portions spaced from each other with the screw threads of each portion extending only partially around the butt member thereby leaving an unthreaded space, said unthreaded spaces being in alignment, of a collar screw threaded to each screw-threaded portion, a clamping sleeve connected to each collar to be moved longitudinally of the rod in both directions by rotation of the collar, the connection between each collar and its sleeve permitting the collar to be turned without turning the sleeve, and the open ends of the sleeves facing each other and being outwardly flared to receive and engage the ends of a reel seat which is positioned in said unthreaded spaces, the two threaded portions and the two collars, each with its clamping sleeve, permitting the reel seat to be bodily adjusted longitudinally of the pole and to be clamped and unclamped from either end.

In testimony whereof, I have signed my name to this specification.

FRANK W. MANSFIELD.